(12) United States Patent
Bradway et al.

(10) Patent No.: US 6,299,759 B1
(45) Date of Patent: Oct. 9, 2001

(54) HYDROPROCESSING REACTOR AND PROCESS WITH GAS AND LIQUID QUENCH

(75) Inventors: Robert A. Bradway, Voorhees, NJ (US); Yingyen P. Tsao, Bryn Mawr, PA (US)

(73) Assignee: Mobil Oil Corporation, Fairfax, VA (US)

(*) Notice: Subject to any disclaimer, the term of this patent is extended or adjusted under 35 U.S.C. 154(b) by 0 days.

(21) Appl. No.: 09/023,734

(22) Filed: Feb. 13, 1998

(51) Int. Cl.[7] .................................................. C10G 65/02
(52) U.S. Cl. .............................. 208/59; 208/108; 208/58; 208/210; 585/752
(58) Field of Search ................................ 208/108, 58, 59, 208/210; 585/752

(56) References Cited

U.S. PATENT DOCUMENTS

| 2,606,862 | * | 8/1952 | Keith ..................................... 208/146 |
| 3,248,316 | * | 4/1966 | Barger, Jr. et al. ..................... 208/58 |
| 3,314,878 | * | 4/1967 | Kozlowski .............................. 208/58 |
| 3,649,523 | * | 3/1972 | Bertolacini et al. ................. 208/111 |
| 3,650,945 | * | 3/1972 | Bertolacini et al. ................. 208/111 |
| 3,728,249 | * | 4/1973 | Antezana et al. ....................... 208/57 |
| 3,859,202 | * | 1/1975 | Brunn et al. ........................... 208/210 |
| 3,928,178 | * | 12/1975 | Frye et al. ........................... 208/210 |
| 3,981,793 | * | 9/1976 | Christie et al. ...................... 208/108 |
| 4,211,634 | * | 7/1980 | Bertolacini et al. ................... 208/59 |
| 4,378,308 | | 3/1983 | Angevine et al. ................. 252/455 R |
| 4,568,448 | | 2/1986 | Angewine et al. .................. 208/213 |
| 5,021,145 | | 6/1991 | Chapple ............................... 208/120 |
| 5,271,826 | | 12/1993 | Krambeck et al. .................... 208/113 |
| 5,389,232 | | 2/1995 | Adewuyi et al. ...................... 208/120 |
| 5,397,457 | * | 3/1995 | Harandi et al. ...................... 208/111 |
| 5,443,718 | | 8/1995 | Buttke et al. ........................ 208/157 |
| 5,466,362 | | 11/1995 | Steinberg et al. .................... 208/157 |
| 5,492,617 | | 2/1996 | Trimble et al. ....................... 208/148 |
| 5,498,326 | | 3/1996 | Galtier et al. ......................... 208/74 |
| 5,954,950 | | 9/1999 | Morel et al. .......................... 208/213 |

* cited by examiner

Primary Examiner—Nadine Preisch
(74) Attorney, Agent, or Firm—Gerard J. Hughes

(57) ABSTRACT

A method and reactor system for catalytic hydrotreating and hydrocracking liquid hydrocarbon feedstock for producing a cracked liquid feedstock having a reduced contaminant level involves introducing the feedstock into the first reaction zone of a reactor system having a plurality of successive reaction zones, each reaction zone having a hydroprocessing catalyst bed therein, at least the first reaction zone comprising a hydrotreating reaction zone and at least one downstream reaction zone comprising a hydrocracking reaction zone, introducing hydrogen gas into the reactor system for flow through and over the catalyst beds in contact with the liquid in the reaction zones, the hydrogen exothermically reacting with the liquid in the reaction zones for producing an effluent for each reaction zone having a temperature greater than the temperature of the influent feedstock to that reaction zone, introducing liquid feedstock having the same composition as the liquid feedstock introduced into the first reaction zone into at least one quench zone downstream of the first reaction zone for admixing with the effluent from the immediately upstream reaction zone, the introduced liquid feedstock having a feed rate and a temperature sufficient to reduce the temperature of the effluent, and injecting quench gas into each quench zone in an amount sufficient, in combination with the effluent from the immediately upstream reaction zone and any introduced liquid feedstock, to reduce the temperature of effluent to within a predetermined range, and recovering the effluent product from the last reaction zone.

11 Claims, 2 Drawing Sheets

HYDROPROCESSING REACTOR AND PROCESS WITH GAS AND LIQUID QUENCH

BACKGROUND OF THE INVENTION

1. Field of the Invention

The present invention relates to hydroprocessing methods and reactors and, more particularly, to a method of and apparatus for utilizing liquid quench to reduce pressure drop and increase throughput in a multiple bed hydrotreating-hydrocracking reactor.

2. Description of the Prior Art

The reaction of hydrocarbons, particularly heavier petroleum feedstocks such as distillates, lubricants, heavy oil fractions, residuum, etc., usually in the presence of a catalyst and elevated temperatures and pressures, is known as hydroprocessing. Typical hydroprocessing processes include hydrodesulfurization, hydrodenitrification, hydroisomerization, hydrodemetallation, hydrocracking, hydrogenation, and the like. For purposes of clarity herein, the term hydrotreating will be used to denote hydroprocessing reactions intended to remove contaminants from liquid hydrocarbon feedstocks, e.g., hydrodesulfurization, hydrodenitrification, hydrodemetallation, and the like.

Historically, hydrocracking catalysts have been particularly intolerant of contaminants, such as sulfur, nitrogen, metals and/or organometallic compounds, which are generally contained in heavy hydrocarbon liquid streams, particularly reduced crude oils, petroleum residua, tar sand bitumen, shale oil, liquified coal, reclaimed oil, and the like. These contaminants tend to deactivate catalyst particles during contact by the liquid hydrocarbon feed stream and hydrogen under hydroprocessing conditions. Therefore, it has become commonplace to catalytically hydrotreat the heavy liquid hydrocarbon feedstock to reduce to an acceptably low level its content of catalyst-poisoning contaminants before introducing the reduced contaminant feedstock to the first of the hydrocracking catalyst beds.

During the sequential processing of the liquid hydrocarbon feedstock, i.e., hydrotreating followed by hydrocracking, considerable heat is generated in each step. As a result, and in order to control the increase in temperature in the catalyst beds as the feedstock moves sequentially therethrough, it has become the practice to quench or cool the effluent reaction products from a prior catalyst bed before introducing them into the next catalyst bed. For this purpose a quench gas medium, such as recycle hydrogen gas, feed hydrogen gas or other suitable quench gases well known in the field, is injected into quench zones situated between the exit of one reaction zone and the entrance to the next zone. Generally, several beds with quench zones, typically from four to ten, are employed to control the increase in temperature in the beds. For example, a hydroprocessing reactor containing four reaction zones would likely have three quench gas injection points. In order to accomplish substantial hydrogen upgrading of the liquid feedstock, exothermal heat rise across each reaction zone will likely require that substantial quench gas be injected in quantities which may exceed the hydrogen gas being consumed by the hydroprocessing reaction occurring in the reactor. Although inter-bed quench gas introduction is effective as a means for reactor temperature profile control, the introduction of the additional quench gas increases the pressure drop across the reactor to a sufficient extent that it frequently limits the throughput capability of the reactor.

One proposed solution to the pressure drop problem is to reduce the quench gas flow as low as possible and operate with a maximum tolerable temperature rise between the feed inlet to the first reaction zone and the effluent from the final reaction zone. While this solution may be a viable compromise in some respects, inasmuch as catalyst fouling rate generally increases with increasing bed temperature, there is an economical price to be paid for this approach in terms of catalyst replacement rate.

As new hydrocracking catalysts have been developed which exhibit an improved tolerance to contaminants, particularly to metals, nitrogen and sulfur, contaminant-tolerant hydrocracking catalysts can replace the hydrotreating catalysts in the upper catalyst beds. This allows the liquid feedstock to be subjected to additional stages of hydrocracking in the same number of catalyst beds in the reactor with an attendant small increase in hydrocracking conversion to lighter products. However, the substitution of contaminant-tolerant catalysts for hydrotreating catalysts in some of the reactor beds does not contribute to a reduction in pressure drop or an increase in throughput if pressure drop is limiting throughput.

Currently a large number of hydrotreating-hydrocracking processes experience extremely high pressure drop and unfavorable throughput capability or undesirably high reactor temperature profiles and unfavorable catalyst life due to the consequences attending reactor temperature control utilizing inter-bed gas quenching. Accordingly, a multi-bed, multi-reaction zone hydrotreating-hydrocracking process that would permit satisfactory reactor temperature profile control while reducing pressure drop through the reactor and improving throughput through the catalyst beds would be desirable.

SUMMARY OF THE INVENTION

It is, therefore, an object of the present invention to provide an economical hydrotreating-hydrocracking process which does not experience the very high pressure drops and reduced throughput characterizing such processes when inter-bed gas quenching is utilized for reactor temperature profile control.

It is another object of the present invention to provide an economical hydrotreating-hydrocracking process which enjoys the benefits of decreased pressure drop and increased throughput while maintaining reactor temperature profile control without the catalyst deactivation disadvantages inherent in processes which do not practice strict reactor temperature profile control.

It is still another object of the present invention to provide an improved multi-bed, multi-reaction zone hydrotreating-hydrocracking process which utilizes liquid feedstock quenching in downstream catalyst beds.

It is yet another object of the present invention to provide an improved multi-bed, multi-reaction zone hydrotreating-hydrocracking process wherein liquid feedstock is injected into one or more downstream quenching zones in lieu of at least some gas quenching in those zones.

It is another object of the present invention to provide an improved multi-bed, multi-reaction zone hydrotreating-hydrocracking process which utilizes contaminant-tolerant hydrocracking catalysts to replace conventional hydrotreating and hydrocracking catalysts in at least some of the reaction zones together with liquid feedstock quenching in lieu of at least some gas quenching.

These objects and others are achieved by providing a hydrotreating-hydrocracking process comprising introducing a liquid hydrocarbon feedstock into a reactor system having multiple reaction zones, each reaction zone having a hydroprocessing catalyst bed therein comprising at least one hydroprocessing catalyst selected to accomplish the hydroprocessing reactions to be conducted in that zone, at least the most upstream zone having a hydrotreating catalyst therein for reducing the level of at least one selected contaminant in the liquid feedstock, at least one of the zones downstream of the hydrotreating catalyst-containing zones having hydrocracking catalysts therein, introducing a portion of the liquid feedstock at the top of the most upstream reaction zone for downward flow through the catalyst bed therein and sequentially, thereafter, through the catalyst beds of the succeeding downstream reaction zones to the base of the reactor, introducing hydrogen gas under pressure into the reactor for flow through the catalyst beds therein in contact with the liquid feedstock in the reaction zones, injecting a quench medium into quench zones between at least some of the adjacent reaction zones, bypassing fresh hydrocarbon liquid feedstock having the same composition as the feedstock introduced into the most upstream reactor zone around at least the most upstream reaction zone and injecting the fresh feedstock into one or more downstream quench zones and withdrawing cracked liquid feedstock having a reduced contaminant level as effluent at the base of the reactor.

In a preferred aspect of the invention one or more of the downstream reaction zones contain contaminant-tolerant catalyst therein. Desirably, the reactor comprises a plurality of vertically arranged spaced reaction zones and, preferably, the hydrogen passes through the catalyst beds in co-current contact with the liquid feedstock in the reaction zones. Typically, the plurality of reaction zones comprises at least two, and commonly more, successive hydrotreating reactor zones upstream of at least two, and commonly more, successive hydrocracking zones. The bypass liquid feedstock is introduced into one or more, up to all, quench zones upstream of hydrotreating and/or hydrocracking reaction zones.

In a particularly preferred aspect of the invention about 5%–60% by volume, preferably 10%–30% by volume, of the total fresh liquid hydrocarbon feedstock introduced into the reactor bypasses about 5%–65% by volume, preferably 10%–40% by volume, of the total hydroprocessing catalyst in the beds.

DESCRIPTION OF THE PREFERRED EMBODIMENT

In accordance with the present invention there is provided a hydrotreating-hydrocracking process comprising introducing a liquid hydrocarbon feedstock into a reactor system having multiple reaction zones, each reaction zone having a hydroprocessing catalyst bed therein comprising at least one hydroprocessing catalyst selected to accomplish the hydroprocessing reactions to be conducted in that zone, at least the most upstream zone having a hydrotreating catalyst therein for reducing the level of at least one selected contaminant in the liquid feedstock, at least one of the zones downstream of the hydrotreating catalyst-containing zones having hydrocracking catalysts therein, preferably contaminant-tolerant hydrocracking catalysts, introducing a portion of the liquid feedstock at the top of the most upstream reaction zone for downward flow through the catalyst bed therein and sequentially, thereafter, through the catalyst beds of the succeeding downstream reaction zones to the base of the reactor, introducing hydrogen gas under pressure into the reactor for flow through the catalyst beds therein in contact with the liquid feedstock in the reaction zones, injecting a quench medium into quench zones between at least some of the adjacent reaction zones, bypassing at least the most upstream reaction zone with fresh hydrocarbon liquid feedstock having the same composition as the feedstock introduced into the most upstream reaction zone and injecting the fresh feedstock into one or more downstream quench zones and withdrawing cracked liquid feedstock having a reduced contaminant level as effluent at the base of the reactor.

Figure 1:
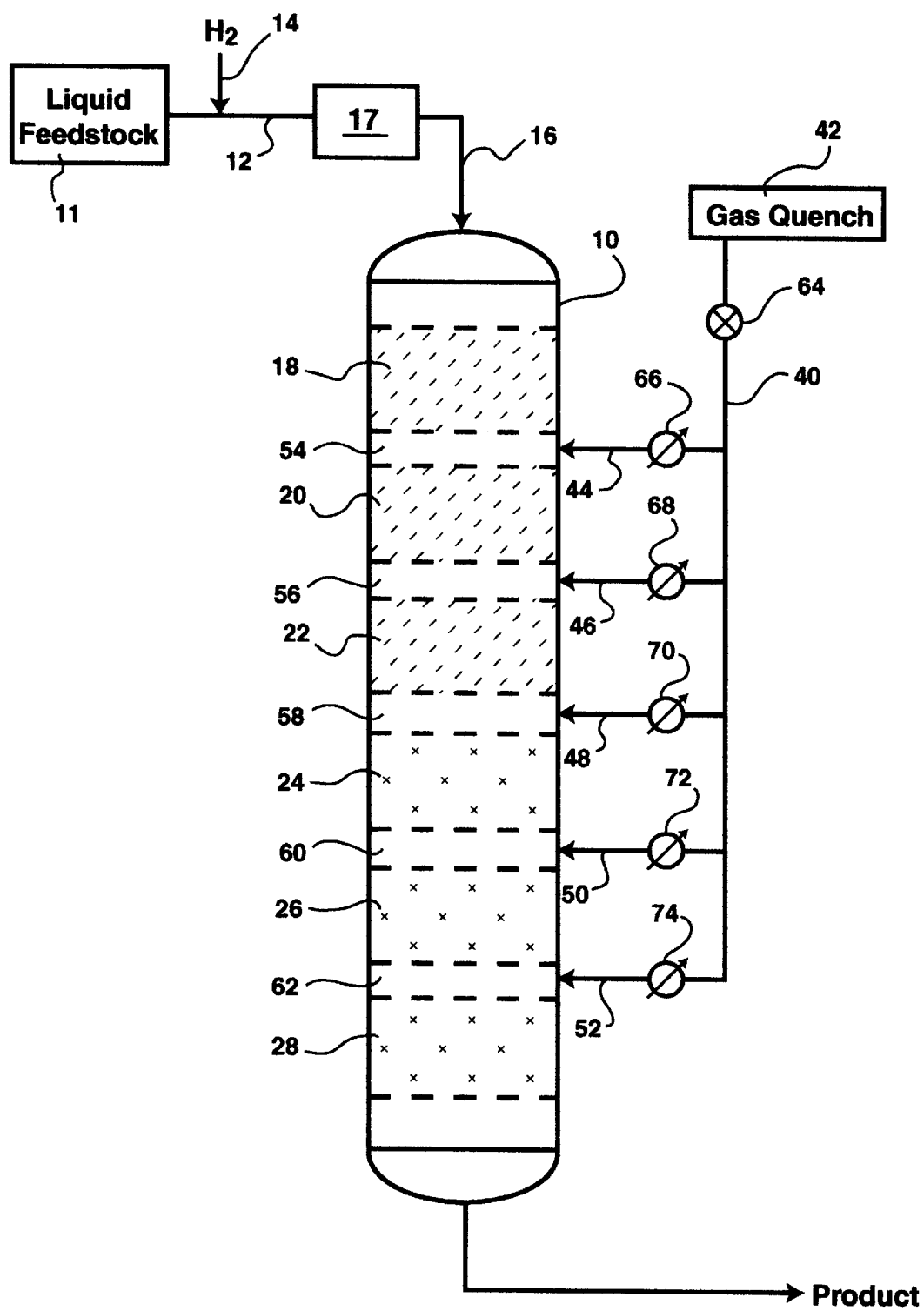
FIG. 1 is a schematic flow diagram of a prior art hydrotreating-hydrocracking processing system showing a vertical reactor with multiple fixed catalyst beds and major flow streams which utilizes inter-bed gas quenching to control the temperature profile within the reactor.

Referring now to the drawings and particularly to FIG. 1, a conventional continuous catalytic hydroprocessing reactor system is shown for hydrotreating a liquid feedstock with a gaseous, predominantly hydrogen, reactant to remove one or more contaminants, e.g., nitrogen, sulfur, metals, and, thereafter, hydrocracking the resulting largely contaminant-reduced liquid feedstock. A hydrocarbon feedstock, from liquid feedstock source 11, in line 12 is combined with a pressurized hydrogen treatment gas introduced through line 14 and the combined streams are heated in a heat exchanger system 17 to a predetermined temperature for the hydroprocessing reactions which are intended to take place in first hydrotreating zone 18. The heated feedstock is introduced into reactor 10 via line 16. Reactor 10 is a cylindrical column, typically constructed of steel or iron or other pressure-retaining metal, which is capable of withstanding the elevated temperatures and pressures experienced during hydroprocessing and of withstanding corrosion. Such reactors are conventional and need not be described in detail. Reactor 10 contains a plurality of vertically spaced catalyst beds supported on catalyst support grids. The catalyst support grids are typically perforated or foraminous plates or their equivalent, which are well known in the art and divide the reactor into a plurality of vertically spaced reaction zones. The heated feedstock entering via line 16 is passed through hydrotreating zone 18 in contact with hydrotreating catalysts appropriate for the hydrotreating reactions intended to take place in zone 18 to obtain a first reaction zone effluent. Typically, first hydrotreating zone 18 is intended to remove contaminants, such as nitrogen, sulfur and/or metals, which are harmful to and will damage conventional hydrocracking catalysts found in downstream hydroprocessing zones. Thus, the temperature of the incoming feedstock and the catalysts in zone 18 are selected, as appropriate, for hydrodenitrification, hydrodesulfurization, hydrodemetallation, or the like. The effluent from zone 18 then passes through the second hydrotreating zone 20 in contact with hydrotreating catalysts appropriate for the hydrotreating reactions intended to take place in zone 20 to produce a second zone effluent. Second hydrotreating zone 20, like first zone 18, is also intended to remove contaminants from the liquid feedstock. Depending upon the selection of the hydrotreating catalysts for zone 20 and the temperature of the feedstock entering zone 20, which is controlled in a manner to be more fully discussed hereinafter, zone 20 may be employed to remove the same or different contaminants as zone 18. The effluent from zone 20 then passes through the third hydrotreating zone 22 in contact with hydrotreating catalysts appropriate for the hydrotreating reactions intended to take place in zone 22 to produce a third zone effluent. Third hydrotreating zone 22, like the previous two zones 18, 20, functions to remove contaminants from the liquid feedstock passing therethrough. As with zone 20, depending upon the selection of hydrotreating catalysts and the temperature of the feedstock entering zone 22, the zone may be employed to remove the same or different contaminants as zones 18, 20.

The effluent from zone 22 then passes through first hydrocracking zone 24 in contact with appropriate hydrocracking catalysts to produce a first hydrocracking zone effluent. Unlike the previous hydrotreating zones, zone 24 is intended to hydrocrack the liquid feedstock and the catalysts employed therewithin and temperature of the feedstock entering zone 24 are selected accordingly. Inasmuch as conventional hydrocracking catalysts are well known to be sensitive to sulfur and/or nitrogen and/or metals poisoning, it was necessary to pretreat the feedstock in hydrotreating zones 18, 20, 22 to achieve a low level of catalyst-poisoning contaminants in the feedstock. As a result, when the effluent from zone 22 is introduced into first hydrocracking zone 24, the effluent is largely contaminant free and the hydrocracking catalysts in zone 24 are not subjected to a high level of poisonous contaminants. The result is that the lives of the hydrocracking catalysts are significantly extended. The effluent from zone 24 passes through the second hydrocracking zone 26 in contact with appropriate hydrocracking catalysts to produce a second hydrocracking zone effluent. The effluent from zone 26 then passes through the third hydrocracking zone 28 in contact with appropriate hydrocracking catalysts to produce a product effluent which is subsequently removed from the reactor through line 30. Like hydrocracking zone 24, zones 26 and 28 are intended to hydrocrack the liquid feedstock and the catalysts employed therewithin and temperature of the feedstock entering these zones are selected accordingly. It will be appreciated that although reactor 10 is herein illustrated to consist of three hydrotreating reaction zones and three hydrocracking reaction zones, in fact, typical hydrotreating-hydrocracking reactors generally consist of from four to ten hydroprocessing zones, the first several being hydrotreating reaction zones and the remainder hydrocracking zones. Moreover, although the illustrated hydrotreating-hydrocracking process is shown as comprising a series of vertically spaced apart reaction zones in a single reactor, it will be appreciated that the reaction zones can be physically located in one or more separate reactors which need not be oriented to permit sequential liquid feedstock flow therethrough via gravity.

Hydrotreating and hydrocracking reactions between a liquid feedstock and hydrogen gas over suitable catalysts are typically highly exothermic reactions during which large amounts of heat are generated. The generated heat, in addition to increasing catalyst temperature, vaporizes low boiling components of the liquid feedstock and substantially increases the temperature of the effluent gas and liquid streams. In reactors having a plurality of sequential reaction zones for the conduct of successive hydroprocessing reactions, the temperature in the first reaction zone will typically be controlled by the feedstock temperature at the reactor inlet to the most upstream zone. However, the temperature in each succeeding reaction zone, if uncontrolled, will be higher than the temperature in the preceding reaction zone due to the heat generated by the exothermic reactions occurring in and the heat absorbed by the gas and liquid streams in each zone. In order for the intended hydroprocessing reactions in each zone to be conducted under optimum conditions and to preserve the catalysts within each zone it has become the practice to control the temperature of each succeeding reaction zone by injecting a quench medium at the exit of the preceding reaction zone. Quench gas has historically been the cooling medium of choice for most fixed or packed bed reactor systems. Typically, the quench gas for utilization as a cooling medium in a hydroprocessing system is hydrogen gas supplied from the reactor gaseous effluent treatment system which produces recycle hydrogen for introduction into the reactor system as hydrogen feedstock or for other purposes, such as quenching. Less frequently, fresh, high-purity make-up hydrogen may be utilized as the quench medium. In some instances, quench gases other than hydrogen may be used although, it will be appreciated, that recycle hydrogen gas is generally economically available and the use of recycle hydrogen gas serves to replenish hydrogen chemically consumed by the hydroprocessing reactions.

As can be seen in FIG. 1, a main quench gas supply line 40 extends from a quench gas source 42 (e.g., a hydrogen source) to branch quench gas supply lines 44, 46, 48, 50, 52 for introduction of quench gas into quench zones 54, 56, 58, 60, 62 located between the respective reaction zones. The main and branch quench gas supply lines contain flow controllers 64, 66, 68, 70, 72, 74 for regulating the flow of quench gas between the quench gas source and the quench zones. Thus, quench gas may be selectively introduced from main line 40 into one or more of the branch lines 44, 46, 48, 50, 52 on appropriate opening or closure of flow controllers, e.g., valves, 64, 66, 68, 70, 72, 74. It will be seen that by controlling the quench zone(s) to which the quench gas is directed and regulating the amount of quench gas introduced into each zone, acceptably close control of the reactor temperature profile can be achieved. Nevertheless, the typically large volume of quench gas that is required to cool the reaction zone effluents in the quench zones contribute to a very high pressure drop in the reactor which limits the reactor's throughput.

Figure 2:
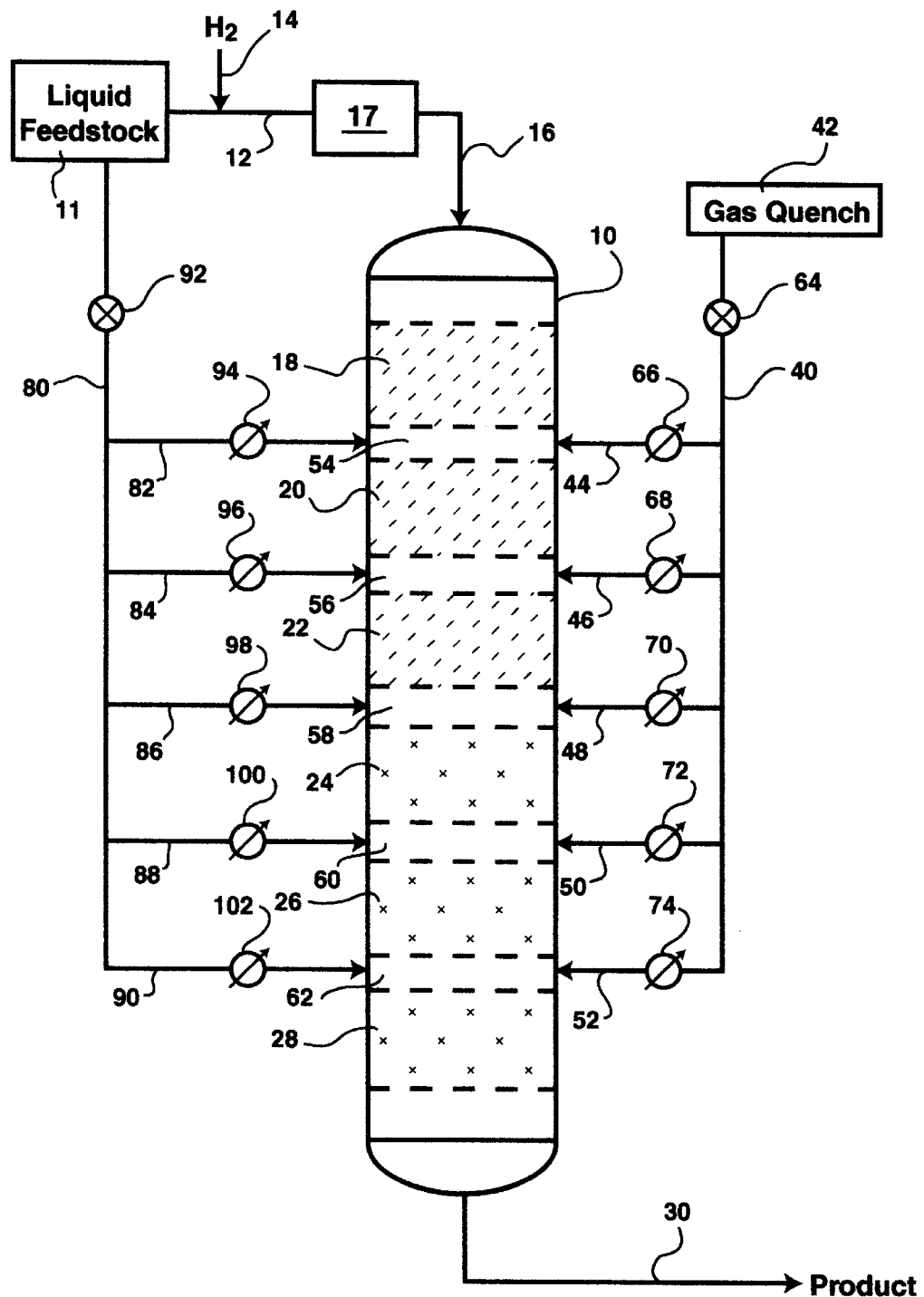
FIG. 2 is a schematic flow diagram of a hydrotreating-hydrocracking processing system in accordance with the present invention which utilizes interbred liquid feed quenching for supplementing inter-bed gas quenching to control the temperature profile within the reactor.

In accordance with the present invention, the amount of quench gas used to control reactor temperature profile can be significantly reduced without permitting temperatures to rise within the reactor, thereby avoiding abnormally high catalyst fouling, e.g., by high carbon deposition. Referring to FIG. 2, wherein like numerals designate like or equivalent elements in FIG. 1, a conventional continuous catalytic hydroprocessing reactor system is shown for hydrotreating a liquid feedstock with a gaseous, predominantly hydrogen, reactant to remove one or more contaminants, e.g., nitrogen, sulfur, metals, and, thereafter, hydrocracking the resulting largely contaminant-reduced liquid feedstock. A hydrocarbon feedstock, from liquid feedstock source 11, in line 12 is combined with a pressurized hydrogen treatment gas introduced through line 14 and the combined streams are heated in a heat exchanger system 17 to a predetermined temperature for the hydroprocessing reactions which are intended to take place in first hydrotreating zone 18. The heated feedstock is introduced into reactor 10 via line 16 and passed through hydrotreating zone 18 in contact with hydrotreating catalysts appropriate for the hydrotreating reactions intended to take place in zone 18 to obtain a first reaction zone effluent. Typically, first hydrotreating zone 18 is intended to remove contaminants, such as nitrogen, sulfur and/or metals, which are harmful to and will damage conventional hydrocracking catalysts found in downstream hydroprocessing zones. Thus, the temperature of the incoming feedstock and the catalyst in zone 18 are selected, as appropriate, for hydrodenitrification, hydrodesulfurization, hydrodemetallation, or the like. The effluent from zone 18 then passes, sequentially, into and through the succeeding hydroprocessing zones 20, 22, 24, 26, 28 in contact with hydroprocessing catalysts appropriate for the hydrotreating or hydrocracking reactions intended to take place in each of these zones. In accordance with an illustrative embodiment of the present invention, zone 20 or zones 20 and 22, which heretofore were hydrotreating reaction zones can be converted to hydrocracking reaction zones by substituting hydrocracking catalysts for the hydrotreating catalysts previously used in these zones, bypassing one or more of the upstream hydrotreating zones with a portion of the same composition liquid feedstock which is introduced into first reactor zone 18 and injecting the bypass liquid feedstock into one or more of the quench zones upstream of the hydrotreating and/or hydrocracking catalyst-containing zones. Preferably, the hydrocracking catalyst in each hydrocracking reaction zone receiving bypass liquid feedstock is contaminant-tolerant hydrocracking catalyst although, in instances where the feedstock is relatively low in contaminants, conventional hydrocracking catalysts can be used even in bypass liquid feedstock-receiving reaction zones.

Prior to hydrotreating or hydrocracking the effluent from a reaction zone immediately upstream of a hydrotreating or hydrocracking reaction zone, the effluent is cooled in a quench zone located between the two zones to a temperature within a predetermined range for the hydrotreating or hydrocracking process intended to be conducted by admixture with relatively cool bypass liquid feedstock, if any is injected into that quench zone and, to the extent necessary, quench gas. Thus, in those quench zones into which it is injected, the bypass liquid feedstock constitutes at least a partial coolant, but not necessarily the sole coolant, for cooling the effluent entering each quench zone. Preferably, the bypass liquid feedstock and the supplemental gas quench together quench an amount of heat in the effluent such that the temperature of the feedstock entering the next reaction zone is within the predetermined range for the hydrotreating or hydrocracking process to be conducted therein.

In the FIG. 2 embodiment, reaction zones 18 and 20 are illustrated as hydrotreating zones while reaction zones 22, 24, 26 and 28 are illustrated as hydrocracking zones which preferably, but not necessarily, contain contaminant-tolerant hydrocracking catalysts. Multiple, layered catalysts are typically used in hydrotreating reaction zones 18 and 20 to remove several unwanted contaminants in the same pass, e.g., sulfur, nitrogen, metals. The temperature of the feedstock introduced into first zone 18 via line 16 is largely controlled by heat exchanger system 17 which may comprise a series of heat exchangers or a combination of heat exchangers and a furnace to most advantageously increase the temperature of the feedstock to the desired range. Following reaction of the liquid feedstock and the hydrogen over the hydrotreating catalysts of zone 18, the effluent from zone 18 is at a considerably higher temperature than the influent feedstock to zone 18. In quench zone 54 downstream of zone 18, bypass liquid feedstock having the same composition as and at a temperature not higher than the liquid feedstock entering through line 16, and desirably at a temperature significantly less than the liquid feedstock entering through line 16, may be introduced into quench zone 54 via main bypass feedstock line 80 and branch bypass feed line 82, upon appropriate opening of flow controllers 92 and 94. The bypass feedstock feed rate into quench zone 54 may vary depending upon the reactor configuration and dimensions, the composition of the liquid feedstock, the nature of the hydrotreating catalysts employed, the temperature of the bypass liquid feedstock, and other considerations. In quench zone 54, the bypass liquid feedstock and the zone 18 effluent admix with the result that the cooler liquid feedstock cools or quenches heat present in the effluent to reduce the temperature of the admixture below the temperature of the effluent. Gas quench, as needed to reduce the temperature of the admixture to a predetermined temperature suitable for the hydrotreating reactions intended for reaction zone 20, is introduced into quench zone 54 via main and branch gas quench lines 40, 44 upon appropriate opening of flow controllers 64, 66 to supplement the quench provided by the bypass liquid feedstock. Of course, if bypass liquid feedstock is not introduced through branch feedstock line 82, then the gas quench flow will, in conventional manner, be adjusted to itself reduce the temperature of the zone 18 effluent to the desired level.

The temperature adjusted admixture, comprising effluent from zone 18 in admixture with any added bypass liquid feedstock, passes downwardly from quench zone 54 through second hydrotreating zone 20 and over the hydrotreating catalysts therein, whereby further exothermic hydrotreating reactions take place in zone 20. The effluent from zone 20 is at a considerably higher temperature than the influent feedstock to zone 20. In quench zone 56 downstream of zone 20, bypass liquid feedstock having the same composition as and at a temperature not higher than the liquid feedstock entering through line 16, and desirably at a temperature significantly less than the liquid feedstock entering through line 16, may be introduced via main bypass feedstock line 80 and branch bypass feed line 84, upon appropriate opening of flow controllers 92 and 96. The bypass feedstock feed rate into quench zone 56 may vary depending upon the reactor configuration and dimensions, the composition of the liquid feedstock, the nature of the hydrotreating catalysts employed, the temperature of the bypass liquid feedstock, and other considerations. In quench zone 56, the bypass liquid feedstock and the zone 20 effluent admix with the result that the cooler liquid feedstock cools or quenches heat present in the effluent to reduce the temperature of the admixture below the temperature of the effluent. Gas quench, as needed to reduce the temperature of the admixture to a predetermined temperature suitable for the hydrocracking reactions intended for reaction zone 22, is introduced into quench zone 56 via main and branch gas quench lines 40, 46 upon appropriate opening of flow controllers 64, 68 to supplement the quench provided by the bypass liquid feedstock. Of course, if bypass liquid feedstock is not introduced through branch feedstock line 84, then the gas quench flow will, in conventional manner, be adjusted to itself reduce the temperature of the zone 20 effluent to the desired level.

The temperature adjusted admixture comprising effluent from zone 20 in admixture with any added bypass liquid feedstock then passes downwardly from quench zone 56 through the first hydrocracking zone 22 in contact with appropriate hydrocracking catalysts to produce a first hydrocracking zone effluent. Unlike the previous hydrotreating zones, zone 22 is intended to hydrocrack the liquid feedstock and the catalysts and temperature of the feedstock entering zone 22 are selected accordingly. Again, because hydrocracking is a highly exothermic reaction, the effluent from zone 22, when it enters quench zone 58, is at a considerably higher temperature than the influent feedstock to zone 22. In quench zone 58, bypass liquid feedstock having the same composition as and at a temperature not higher than the liquid feedstock entering through line 16, and desirably at a temperature significantly less than the liquid feedstock entering through line 16, may be introduced via main bypass feedstock line 80 and branch bypass feed line 86, upon appropriate opening of flow controllers 92 and 98. The bypass feedstock feed rate into quench zone 58 may vary depending upon the reactor configuration and dimensions, the composition of the liquid feedstock, the nature of the hydrocracking catalysts employed, the temperature of the bypass liquid feedstock, and other considerations. In quench zone 58, the bypass liquid feedstock and the zone 22 effluent admix with the result that the cooler liquid feedstock cools or quenches heat present in the effluent to reduce the temperature of the admire below the temperature of the effluent. Gas quench, as needed to reduce the temperature of the admixture to a predetermined temperature suitable for the hydrocracking reactions intended for reaction zone 24, is introduced into quench zone 58 via main and branch gas quench lines 40, 48 upon appropriate opening of flow controllers 64, 70 to supplement the quench provided by the bypass liquid feedstock. Of course, if bypass liquid feedstock is not introduced through branch feedstock line 86, then the gas quench flow will, in conventional manner, be adjusted to itself reduce the temperature of the zone 22 effluent to the desired level.

Hydrocracking zones 24, 26 and their associated downstream quench zones 60, 62 operate in the same manner as hydrocracking zone 22 and its associated downstream quench zone 58. Thus, hydrocracking reactions occur in each reaction zone 24, 26 with the result that the heat generated in those zones increases the temperature of the effluent from zones 24, 26 to a temperature considerably higher than that of the influent liquid feedstock to zones 24, 26. The effluent from each of zones 24, 26 enters respective quench zones 60, 62 wherein it is admixed with bypass liquid feedstock having the same composition as and at a temperature not higher than the liquid feedstock entering through line 16, and desirably at a temperature significantly less than the liquid feedstock entering through line 16, which may be introduced into quench zones 60, 62 via main bypass feedstock line 80 and branch bypass feed lines 88, 90, upon appropriate opening of flow controllers 92 and 100, 102. The bypass feedstock feed rates into quench zone 60, 62 may vary depending upon the reactor configuration and dimensions, the composition of the liquid feedstock, the nature of the hydrocracking catalysts employed, the temperature of the bypass liquid feedstock, and other considerations. In each quench zone 60, 62, the bypass liquid feedstock and the entering effluent admix with the result that the cooler liquid feedstock cools or quenches heat present in the effluent to reduce the temperature of the admixture below the temperature of the effluent. Gas quench, as needed to reduce the temperature of the admixture to a predetermined temperature suitable for the hydrocracking reactions intended for downstream reaction zones 26, 28 is introduced into quench zones 60, 62 via main gas quench line 40 and branch gas quench lines 50, 52 upon appropriate opening of flow controllers 64 and 72, 74 to supplement the quench provided by the bypass liquid feedstock. Of course, if bypass liquid feedstock is not introduced through either of branch feedstock lines 88, 90, then the quench gas flow in each zone will, in conventional manner, be adjusted to itself reduce the temperature of the entering effluents to the desired level.

The temperature adjusted admixture comprising the effluent from zone 26 in admixture with any added bypass liquid feedstock then passes downwardly from quench zone 62 through final hydrocracking zone 28 in contact with appropriate hydrocracking catalysts to produce a final hydrocracking zone effluent. The effluent from hydrocracking reaction zone 28 is the desired cracked liquid feedstock having a reduced contaminant level which is removed from the reactor via product line 30 and directed for further processing and product recovery. Generally, the reactor effluent, which contains both gas and liquid phases, is processed in a gas-liquid separator for separation of the liquid phase which is either stored or directed for further processing. The gas phase effluent from the lower end of reactor 10 contains excess hydrogen, vaporized low boiling hydrocarbons of a composition generally similar to that of the lower boiling components of the liquid feedstock, possibly hydrogen sulfide, ammonia and inert gaseous components. Where the hydrogen values in the gas phase are sufficiently significant, recycle hydrogen may be recovered for use in the hydroprocessing reactor and/or the gas quench system. In such a case, the gas phase effluent may be cooled to condense the vaporized liquid components, passed to a separator to separate the condensed liquid from the gas phase, vented to prevent the buildup of inert gaseous impurities in the system, scrubbed to remove hydrogen sulfide, as by amine absorption or other suitable processing, compressed to increase the pressure of the gaseous contaminant-free hydrogen and directed into admixture with the fresh hydrogen feed introduced through gas feed line 14 at the top of reactor 10 or to the gas quench source 42 for storage and eventual reuse.

Into which quench zones bypass liquid feedstock is injected and how much is injected into each quench zone depends upon a number of factors. It is well known that the highest pressure drop typically occurs in the most upstream hydrotreating reaction zone, namely zone 18. As much as 60–70% of the total pressure drop generally occurs in this first reaction zone. Likewise, it is well known that the next highest pressure drop typically occurs in the next most upstream reaction zone, namely zone 20. As much as 20% of the total pressure drop is observed through the second catalyst bed. Thus, it will be appreciated that, on the one hand, it would seem prudent to reduce the flow of liquid feedstock through one or both of these reaction zones. This, of course, can be accomplished by bypassing liquid feedstock around one or both of these zones. However, the hydrotreating reaction zones serve an important purpose and, it will be appreciated, on the other hand, it is important to hydrotreat as much liquid feedstock as possible to reduce its contaminant level and to make maximum use of all of the catalyst in the hydrotreating catalyst beds. These seemingly conflicting interests lead to different assessments, in each case, as to which reaction zones get bypassed with how much liquid feedstock. In each instance, the assessment is based upon a knowledge of the actual pressure drop across each catalyst bed, which may very well be a function of the reactor equipment in use and the type and amount of catalyst in each bed. For example, the amount of catalyst in each bed can be varied. Thus, it is not unusual to place less catalyst in the most upstream catalyst bed, where it is known that the pressure drop will likely be the highest, in order to avoid exacerbating the problem. As a consequence, bypassing the first catalyst bed with a larger proportion of liquid feed than bypasses other catalyst beds not only contributes to minimizing the pressure drop and throughput problems but also contributes to maximizing overall catalyst usage. Other factors influencing the assessment as to which beds to bypass and with how much liquid feedstock include the liquid feedstock composition, in particular, the identity and concentration of contaminants in the feedstock; the temperature at which liquid feedstock is readily available, which determines its efficacy as a quenching medium; and, the number of catalyst beds in the reactor system. In a particularly preferred manner of operating the reactor system of the present invention about 5%–60% by volume, preferably 10%–30% by volume, of the total fresh liquid hydrocarbon feedstock introduced into the reactor bypasses about 5%–65% by volume, preferably 10%–40% by volume, of the total hydroprocessing catalyst in the beds.

Typical hydroprocessing conditions in which the reactor and process of the present invention may be advantageously employed include a temperature range of from about 550° to 950° F. and reactor pressures of from 100 to 5,000 psig. The liquid hourly space velocity (LHSV) may be in the range from about 0.1 $hr^{-1}$ to about 10 $hr^{-1}$. The total hydrogen to the reactor (fresh hydrogen feed plus quench hydrogen) is in the range of from 300 to 5,000 standard cubic feet of hydrogen per barrel of feedstock. It will be appreciated that, generally within the aforementioned ranges, different preferred reaction conditions will apply for different types of hydroprocessing reactions.

The catalysts employed in the process of the present invention may consist of any conventional hydroprocessing catalyst. In general, the oxides and sulfides of transitional metals are useful, and especially the group VIb and Group VIII metal oxides and sulfides. In particular, combinations or composites of one or more group Vib metal oxides or sulfides with one or more of group VIII metal oxides or sulfides is generally preferred. For example, combinations of nickel-tungsten oxides and/or sulfides, cobalt-molybdenum oxides and/or sulfides and nickel-molybdenum oxides and/or sulfides are particularly contemplated. However, iron oxide, iron sulfide, cobalt oxide, cobalt sulfide, nickel oxide, nickel sulfide, chromium oxide, chromium sulfide, molybdenum oxide, molybdenum sulfide, tungsten oxide or tungsten sulfide, among others, may be used.

Where it is desirable to utilize contaminant-tolerant hydrotreating or hydrocracking catalysts, the present invention comprehends the use of any such catalysts well known in the field. Typically, the contaminant tolerance of catalysts is affected by changes in pore volume, pore size, changes in the metal concentrations in the catalysts and admixture with or inclusion of contaminant trapping additives. For example, attempts to cope with the harmful effects of metals, particularly the organic compounds of metals such as vanadium, iron and nickel, have focused on modification of the catalyst itself. These modifications have included admixture with sacrificial catalyst particles, and inclusion in the catalyst, as by coating, of specified amounts of metal-trapping additives, including hydrated metal oxides such as alumina, silica, titania, zirconia and certain compounds of calcium and magnesium. Other methods, such as those particularly directed at vanadium, have included in the catalyst mixed oxides from heavier alkaline earth elements (e.g., calcium, strontium, barium) and elements from Group IV of the Periodic Table (e.g., tin, titanium). These compounds, several of which are disclosed in U.S. Pat. No. 5,021,145, have no harmful properties themselves and are present in amounts sufficient to either react with and immobilize the vanadium or act as a vanadium passivator. Attempts to deal with the poisoning effects of sulfur and nitrogen have concentrated on controlling the pore size distribution of the catalyst.

The catalysts are preferably supported on a relatively inert carrier. Generally, minor proportions of the active metal compounds are used, ranging between about 1% and 25% by weight. Suitable carriers include, but are not limited to, alumina, silica, kieselguhr, diatomaceous earth, magnesia, zirconia, titania, or other inorganic oxides, or zeolites, alone or in combination.

The process of the present invention is adaptable to a variety of interphase ;catalytic reactions, particularly for treatment of heavy oils with hydrogen-containing gas at elevated temperatures and pressures. For this reason any number of liquid feedstock materials are suitable. In particular, feedstocks which may be treated in accordance with the present process include, in general, any mineral oil stock having an end boiling point in excess of about 500° F. In the use of such feedstocks the heavy ends will constitute a relatively fixed and unchanging liquid phase during hydroprocessing while the light ends will generally vaporize. Specific examples of such stocks include crude oils, reduced crude oils, deasphalted reduced crude oils, light gas oils, heavy gas oils, kerosene-gas oil fractions heavy naphtha-gas oil fractions, fuel oil fractions, and the like. These stocks may be derived from petroleum, shale, tar sands and similar natural deposits.

It will be appreciated from the foregoing description of the process and reactor of the present invention that its adoption and use could confer significant benefits as contrasted with conventional hydroprocessing operations. One major advantage is the ability to increase the throughput at increased levels of hydrocracking conversion.

While the invention has been described primarily by reference to reactors having a plurality of vertically spaced catalyst beds therewithin and to co-current flow between the liquid hydrocarbon feedstock and the hydrogen treating gas, it will be appreciated that the process is applicable to multiple reactor systems, whether or not they utilize gravity flow between catalyst beds, and to fluidized bed systems and countercurrent flow systems as well. Accordingly the scope of this invention is intended to encompass functional equivalents of the specific embodiments described above and is not intended to be limited other than as set forth in the claims.

What is claimed is:

1. A temperature profile and pressure drop control method for hydroprocessing, comprising:
   (a) injecting a stream of a hydrogen containing gas and a first portion of a liquid hydrocarbon feed into at least one hydroprocessing reactor, wherein the hydrocarbon feed comprises a first and second portion, the reactor having
      (i) an upstream end and a downstream end with the stream being injected into the reactor's upstream end,
      (ii) a plurality of successive reaction zones distributed along the reactor between the upstream and downstream end zones, each reaction zone having a bed of hydroprocessing catalyst contained therein, and
      (iii) a plurality of interstage quench zones, the quench zones being distributed along the reactor and each being situated between successive reaction zones;
   (b) introducing liquid hydrocarbon feed into at least one quench zone; and
   (c) injecting a quench gas into each quench zone, the second portion of the liquid hydrocarbon feed and the quench gas each being injected in an amount sufficient to control the reactor's temperature profile and pressure drop.

2. A method, as claimed in claim 1, wherein said reaction zones are vertically spaced apart with each reaction zone above the next successive reaction zone.

3. A method, as claimed in claim 1, wherein said plurality of successive reaction zones comprises at least two successive hydrotreating zones followed by at least two successive hydrocracking zones.

4. A method, as claimed in claim 1, wherein said at least one quench zone into which the second portion of the liquid hydrocarbon feed is introduced is a quench zone upstream of a hydrocracking reaction zone.

5. A method, as claimed in claim 4, wherein said second portion of the liquid hydrocarbon feed is additionally introduced into at least one quench zone upstream of a hydrotreating reaction zone.

6. A method, as claimed in claim 3, wherein said liquid hydrocarbon feed is introduced into all quench zones upstream of hydrocracking reaction zones.

7. A method, as claimed in claim 3, wherein at least one of the reaction zones downstream of at least one of the plurality of the interstage quench zones contains a contaminant-tolerant hydrocracking catalyst.

8. A method, as claimed in claim 1, wherein about 5%–60% by volume of the total liquid feedstock introduced into said reactor bypasses about 5%–65% by volume of the total hydroprocessing catalyst in said beds.

9. A method, as claimed in claim 1, further comprising conducting a gaseous effluent away from the hydroprocessing reactor, the gaseous effluent comprising unreacted hydrogen, low boiling point hydrocarbon vapors and reaction product vapors, collecting said gaseous effluent, processing said gaseous effluent to recover a hydrogen-rich gaseous stream and recycling said hydrogen-rich gaseous stream.

10. The method of claim 1 further comprising conducting at least a hydroprocessed hydrocarbon away from the downstream end of the reactor, wherein the hydroprocessed hydrocarbon contains cracked liquid hydrocarbon feed and has a reduced contaminant compared to the feed.

11. The method of claim 1 wherein the second portion and quench gas are injected in an amount sufficient to control the reactor's temperature profile and pressure drop to provide a reactor temperature ranging from 550° F. to 950° F. and a reactor pressure ranging from 100 psig to 5,000 psig.

* * * * *